May 30, 1944.	H. J. FANGER	2,350,103
FIRING ANGLE INDICATOR
Filed April 6, 1942
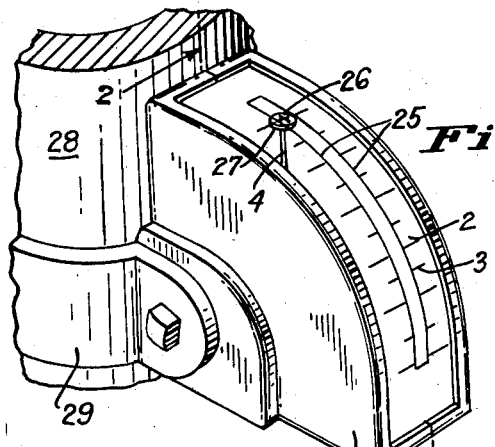
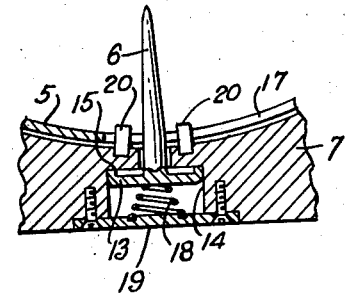
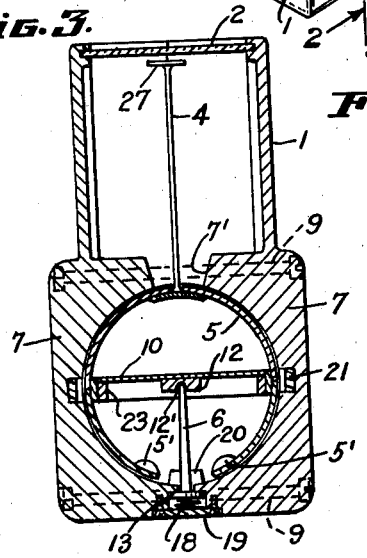
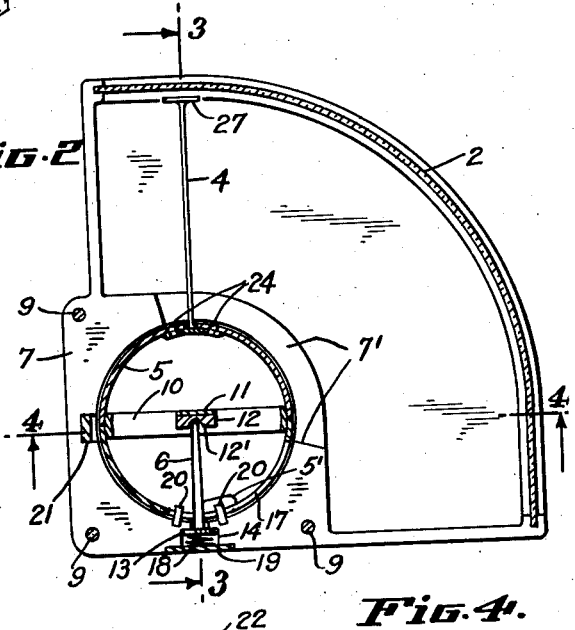
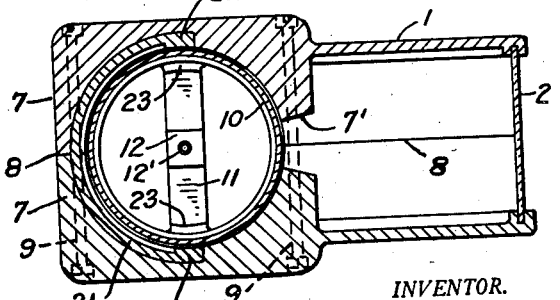
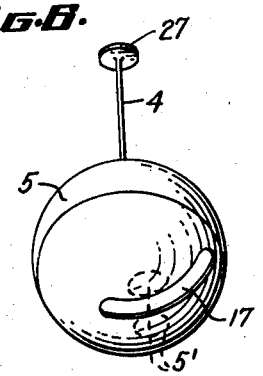
INVENTOR.
HERMAN J. FANGER
BY
ATTORNEY.

Patented May 30, 1944

2,350,103

UNITED STATES PATENT OFFICE 2,350,103

FIRING ANGLE INDICATOR

Herman J. Fanger, Piedmont, Calif., assignor of thirty per cent to Martin C. Mogensen, Martinez, thirty per cent to Herbert W. Erskine, Piedmont, thirty per cent to Cleve F. Shaffer, San Francisco, and five per cent to Henry Gruenhagen, Oakland, Calif.

Application April 6, 1942, Serial No. 437,732

7 Claims. (Cl. 33—215)

This invention relates to levels or plumb and angle indicators and particularly to such angle indicators as are used in connection with ordnance in determining the firing angle of guns and mortars.

The principal object of the invention is to provide a small portable device for the purpose mentioned which will be very sensitive and yet will be proof against injury by shock, as the shock due to firing a heavy gun on which the device is mounted.

Other features and advantages of the invention will appear in the following description and accompanying drawing.

In the drawing—

Fig. 1 is a perspective view of my improved angle indicator as it would appear clamped to a portion of a barrel of a gun.

Fig. 2 is a vertical central sectional view of the indicator as seen from the line 2—2 of Fig. 1.

Fig. 3 is a vertical section of Fig. 2 as seen from the line 3—3 thereof.

Fig. 4 is a horizontal section of Fig. 1 as taken along the line 4—4.

Fig. 5 is an enlarged vertical section, showing the pivotal support of the ball which carries the indicator needle.

Fig. 6 is a perspective view of the ball and its indicator needle and showing the slot in the bottom of the ball through which the pivotal support projects.

Before describing the drawing in detail the general construction of the instrument may be explained so as to make the understanding of the drawing easier. To this end it may be said that my angle indicator comprises a small casing adapted to be clamped or otherwise secured to a barrel of a gun or mortar, and the casing has an arcuate transparent or translucent wall or dial graduated with marks designating various angles of inclination from the vertical to about 80 or 90 degrees therefrom and within the casing is pivotally mounted a hollow ball of very light construction preferably aluminum or plastic, and the pivotal support of which ball consists of a single vertical extending pivot or needle with its upper end in a socket carried by a cross arm or spider within the ball so that the point of the needle will be precisely the center of the ball and the ball may rock on the needle point about its true center for a limited distance as determined by a slot in the bottom of the ball through which the supporting needle projects from its mounting. Extending from the uppermost point of the ball is an indicator needle or pointer which is secured to the ball and consequently oscillates adjacent the before mentioned graduated arcuate dial. The extreme end of the pointer preferably contains a luminous or radio active cross line to cooperate with the graduations on the arcuate dial surface which are also preferably luminescent or fluorescent as will be more fully explained later on.

Since the pointer projects above the ball it would naturally throw it off balance and to compensate for this the ball is counterweighted within at its lower side and also in a manner to compensate for the portion of its lower wall removed to form the slot through which its supporting needle extends.

Since such a device as described would be extremely delicate any shock would of course throw the ball off its single supporting point or needle and likewise injure the contacting surfaces, means is provided to prevent such a result from any shock which may be applied to it. Such means consists in mounting the ball for oscillation in very close spaced relation to a globular socket in which the ball is substantially enclosed except for a slot through which the indicator needle extends. The spacing of the globular socket from the oscillatory ball is very slight, something in the order of a thousandth of an inch, and the supporting needle itself instead of being rigid is resiliently mounted so that upon shock of the instrument the supporting needle is free to bend over slightly to any side and permit the exterior of the ball to immediately contact its globular housing and thus support it from injury until the shock has subsided.

Also since the oscillatory ball is pivotally supported on a single point, i. e., the upper end of its supporting needle resting in a rounded socket carried by a cross arm within the ball, it follows that the ball would normally be free to spin on a vertical axis extending through its lone support. To prevent such a spinning action the outer ends of the cross arm which carry the socket within the ball are made of magnetic material or a small piece of magnetic material is secured to the ball at opposite inner sides of the ball adjacent the ends of said cross arm, and in the globular socket surrounding the ball is positioned a permanent magnet which is operative upon the two pieces of magnetic material so as to stabilize the ball against spinning action, or if slight spinning should take place the ball is quickly brought back to its initial position by the action of the magnet.

With the above mental picture of the instrument and its salient features clearly in mind the details of construction as shown in the various figures of the drawing will now be pointed out.

In the drawing 1 is the outer casing, 2 is the arcuate transparent or translucent dial wall graduated for various angles of inclination as at 3, and 4 is the indicator needle or pointer within the casing and which pointer is secured to and projects upwardly from the hollow ball 5, in turn pivotally mounted at its center on the upper end of the single upright pin or needle support 6 in very close spaced relation to the globular housing block 7 which is centrally split as at 8 and clamped around the ball as by the screws 9, and provided with a slot 7' on one side for the pointer.

The ball is preferably of very thin light metal or plastic and made in two halves cemented or otherwise joined together in overlapping relation to an internal reinforcing ring 10 which may also be cemented in place. Within ring 10 is a cross arm of spider 11 secured at its ends to the ring and carrying in its center a pivot block 12 preferably of hard metal, or a jewel, which may be cemented or otherwise secured in place and the underside of which is hollowed out to form a small rounding depression or socket 12' at the center of the ball and which is supported on the upper rounded end of the supporting pin 6.

Supporting pin 6 is preferably flexible, or flexibly mounted at its base, so that upon any violent shock or jarring of the instrument the ball can move bodily in any direction to contact the inner surface of the globular housing block 7, the normal separation being preferably about a thousandth of an inch. To this end the supporting pin or needle may be tapered as shown in Fig 5 and provided with a circular flange 13 at its thicker lower end, and which flange is freely positioned in a counterbore 14 in the housing block and seated against a shoulder 15 while the shank of the pin 6 projects freely through a hole 16 in the block and through an arcuate slot 17 formed in the lower wall of the ball. A conical compression spring 18 reacts between the bottom of the flange 13 and a plate 19 secured across the counterbore and resiliently forces the flange against the shoulder 15 with the supporting pin vertical yet free to tip in any direction or to move downwardly under the influence of a shock, to permit the ball momentarily seating against the inner surface of its globular housing. The arcuate slot 17 in the lower side of the ball is of a length to permit the ball to oscillate the indicator pointer 4 about 80 or 90 degrees of arc along the curved reading dial wall 2 and is preferably positively stopped at either end of its travel by short stop pins or blocks 20 which project upwardly from the block 7 into the slot. These stops may be of synthetic rubber or other yielding material to minimize shock and the arcuate slot is enough wider than these stops to permit about 5 degrees of lateral oscillation of the indicator pointer so that the gun upon which the instrument is used may be checked for vertical alignment in one direction and for its angular inclination with respect to the horizontal or vertical in the other direction or at right angles to the first.

To prevent such rotative or spinning movement of the ball on the axis of its lone pivotal support as would cause it to bring the side of the slot 17 against the stops 20, but to hold the ball centrally spaced free of these stops except upon a sudden shock I preferably use a permanent magnet 21 the poles 22 of which act upon a couple of armature blocks 23 of magnetic material secured within and at opposite sides of the ball or reinforcing ring 10. This arrangement will always return the ball to central position after any slight displacement around the axis of its supporting pin 6. If desired the ball may be further stabilized by filling the slight clearance between the ball and its globular housing with oil of a viscosity to remain in place, or with a thinner oil or liquid which also fills the whole ball as well, and in which case two or more vent holes 24 may be provided at the top of the ball.

The curved dial wall 2 may be of glass, Celluloid, or plastic, transparent or translucent, and the graduation preferably include the spaced horizontal short marks 3 projecting outwardly from two vertically extending spaced lines 25, while at the outer end of the indicator pointer is a small right angle cross 26 the vertical line of which is centrally spaced between the two dial lines 25 (when side walls of the body of the instrument are vertical), and the horizontal line of the cross will line up with the various inclination lines 3 as the instrument is tilted by swinging the gun upon which it is mounted. The pointer cross lines are preferably engraved on a small plate 27 carried at the end of the needle, and while the graduations and cross may be of any contrasting colors or black or white, for purposes of reading in darkness without extraneous illumination I prefer to have the engraved cross coated at the bottom with a radio-active substance overlaid or mixed with a fluorescent material so that it will glow, and the dial graduations to incorporate a fluorescent substance so that those adjacent the needle will glow from the action of the radio-active material incorporated in its cross, though if desired all of the dial graduations and lines, together with any angular value of the graduations, or any other firing or range data desired on the dial, may be of luminous paint or phosphorescent material.

The counterweighting of the ball to compensate for the pointer 4, and slot 17 which extends more at one side beyond the lower center of the ball, is accomplished by a pair of suitable weights 5' secured to the inner surface of the ball at opposite sides of its slot 17.

In use the instrument may be detachable or permanently secured or clamped to the gun barrel 28 or any part of the gun which moves with the barrel when the gun is tilted, as by the strap 29 or in any desired manner.

I claim:

1. A firing angle indicator comprising a ball, means pivotally mounting the ball on a single vertically disposed supporting point at the center of the ball, a pointer carried by and projecting from the ball, a graduated dial adjacent which the pointer swings when oscillated with said ball on said supporting point, means on said ball counterweighting said pointer, and fixed means free of but close to the outer surface of the ball arranged to contact the ball upon displacement of the center of the ball in any direction.

2. In a structure as set out in claim 1 means preventing said ball from objectionable spinning movement about the vertical axis of said point, while permitting free vertical oscillation of its pointer adjacent said dial.

3. In a firing angle indicator of the character described having an oscillatory pointer, a transparent arcuate cover strip or dial overlying said pointer and graduated to devote the degree of swinging of said pointer, the end of said pointer bearing a cross, and the dial bearing two spaced lines between which one of the cross arms moves centrally when the instrument is vertical and whereby any displacement of the instrument from the vertical is indicated by the arm of the cross being displaced from its central position between said lines.

4. A firing angle indicator comprising a hollow housing, a ball within said housing, means pivotally mounting the ball on a single vertically disposed supporting point at the center of the ball, a pointer carried by and projecting from the ball, a graduated dial adjacent which the pointer swings when oscillated with said ball on said supporting point, and means on said ball counterweighting said pointer, said housing substantially enclosing said ball and clearing the exterior of the ball just sufficiently to insure free movement of the ball on its pivotal support.

5. A firing angle indicator comprising a hollow housing, a ball within said housing, means pivotally mounting the ball on a single vertically disposed supporting point at the center of the ball, a pointer carried by and projecting from the ball, a graduated dial adjacent which the pointer swings when oscillated with said ball on said supporting point, and means on said ball counterweighting said pointer, said housing substantially enclosing said ball and clearing the exterior of the ball just sufficiently to insure free movement of the ball on its pivotal support, and means resiliently mounting said supporting point to permit the ball to move bodily with the pivotal mounting to touch said housing, upon shock to the device.

6. A firing angle indicator comprising a hollow housing, a ball within said housing, means pivotally mounting the ball on a single vertically disposed supporting point at the center of the ball, a pointer carried by and projecting from the ball, a graduated dial adjacent which the pointer swings when oscillated with said ball on said supporting point, and means on said ball counterweighting said pointer, said supporting point comprising a pin projecting through a slot in said ball, said pin provided at its base with a laterally extending flange, a supporting socket in which said flange is freely seated, and spring means resiliently holding said flange in place yet permitting rocking of the pin upon shock to the device.

7. A firing angle indicator comprising a hollow housing, a ball within said housing, means pivotally mounting the ball on a single vertically disposed supporting point at the center of the ball, a pointer carried by and projecting from the ball, a graduated dial adjacent which the pointer swings when oscillated with said ball on said supporting point, means on said ball counterweighting said pointer, a slot formed in the lower part of said ball, and said supporting point comprising a pin projecting through said slot, and means at the base of the pin resiliently supporting the same in upright position while permitting rocking of the pin upon shock to the device.

HERMAN J. FANGER.